(12) United States Patent
Crowe et al.

(10) Patent No.: US 10,318,980 B2
(45) Date of Patent: Jun. 11, 2019

(54) COMPUTER-IMPLEMENTED METHODS, COMPUTER PROGRAM PRODUCTS, AND MACHINES FOR MANAGEMENT AND CONTROL OF A LOYALTY REWARDS NETWORK

(71) Applicant: METABANK, Sioux Falls, SD (US)

(72) Inventors: Andrew B Crowe, Barrington, RI (US); Scott H Galit, New York, NY (US)

(73) Assignee: METABANK, Sioux Falls, SD (US)

( * ) Notice: Subject to any disclaimer, the term of this patent is extended or adjusted under 35 U.S.C. 154(b) by 1156 days.

(21) Appl. No.: 13/846,975

(22) Filed: Mar. 19, 2013

(65) Prior Publication Data

US 2013/0218658 A1 Aug. 22, 2013

Related U.S. Application Data

(63) Continuation of application No. 12/892,847, filed on Sep. 28, 2010, now abandoned, which is a
(Continued)

(51) Int. Cl.
*G06Q 30/00* (2012.01)
*G06Q 30/02* (2012.01)

(52) U.S. Cl.
CPC ......... *G06Q 30/0233* (2013.01); *G06Q 30/02* (2013.01); *G06Q 30/0226* (2013.01); *G06Q 30/0234* (2013.01)

(58) Field of Classification Search
CPC ............... G06Q 30/02; G06Q 30/0226; G06Q 30/0233; G06Q 30/0234
(Continued)

(56) References Cited

U.S. PATENT DOCUMENTS 3,752,904 A 8/1973 Waterbury
4,247,759 A 1/1981 Yuris et al.
(Continued)

FOREIGN PATENT DOCUMENTS

EP 0397512 A2 11/1990
EP 0619565 A1 10/1994
(Continued)

OTHER PUBLICATIONS

Final Office Action for co-pending U.S. Appl. No. 12/338,584 dated Sep. 15, 2011.
(Continued)

*Primary Examiner* — Luis A Brown
(74) *Attorney, Agent, or Firm* — Bracewell LLP

(57) ABSTRACT

Machines, computer program products, and computer-implemented methods to manage and control a loyalty rewards network and to provide customer loyalty rewards to a customer for purchasing goods or services. Computer program product can determine if a customer is one of the plurality of member customers enrolled in the loyalty rewards network. If the customer is not a member, the computer program product can enroll the customer in the loyalty rewards network. As a purchase are made by member customers thereafter, the member customer swipes or otherwise enters a loyalty reward card number and the computer accumulates and stores loyalty rewards network data representative of the member customer's purchasing behavior. Upon accumulating sufficient loyalty rewards pursuant to collection parameters, the member customers can select one or more of the available loyalty reward actions and the computer program product can implement the selected one or more loyalty rewards action.

11 Claims, 6 Drawing Sheets

Related U.S. Application Data continuation of application No. 12/626,349, filed on Nov. 25, 2009, now Pat. No. 9,213,965.

(60) Provisional application No. 61/246,391, filed on Sep. 28, 2009.

(58) Field of Classification Search
USPC ............... 705/14.2, 14.27, 14.33, 14.34
See application file for complete search history.

(56) References Cited

U.S. PATENT DOCUMENTS

| | | |
|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,151,582 A | 9/1992 | Fujioka |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,531,482 A | 7/1996 | Blank |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,724,575 A | 3/1998 | Hoover et al. |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A * | 7/1999 | Fredregill ............ G06Q 20/342 235/375 |
| 5,933,812 A | 8/1999 | Meyer et al. |
| 5,940,812 A | 8/1999 | Tengel et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin, Jr. et al. |
| 6,315,193 B1 | 11/2001 | Hogan |
| 6,330,544 B1 | 12/2001 | Walker et al. |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,793,131 B2 | 9/2004 | Hogan |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,363,265 B2 | 4/2008 | Horgan |
| 7,370,076 B2 | 5/2008 | Friedman et al. |
| 7,392,224 B1 * | 6/2008 | Bauer ............... G06Q 20/04 705/35 |
| 7,398,919 B2 | 7/2008 | Cooper |
| 7,421,410 B1 * | 9/2008 | Schechtman ........ G06Q 20/105 705/35 |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,584,887 B1 | 9/2009 | Sanchez et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |

(56) References Cited

U.S. PATENT DOCUMENTS

| | | |
|---|---|---|
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,380,623 B1 | 2/2013 | Ley et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,396,754 B2 | 3/2013 | Dooley et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,583,515 B2 | 11/2013 | Sorbe et al. |
| 8,583,549 B1* | 11/2013 | Mohsenzadeh ...... G06Q 20/227 705/39 |
| 8,602,297 B2 | 12/2013 | Wilen |
| 8,635,131 B1* | 1/2014 | Saunders ............... G06Q 20/04 705/35 |
| 8,636,203 B1 | 1/2014 | Patterson et al. |
| 8,725,644 B2 | 5/2014 | Schlesser et al. |
| 2001/0013542 A1 | 8/2001 | Horowitz et al. |
| 2001/0021925 A1 | 9/2001 | Ukigawa et al. |
| 2001/0032251 A1 | 10/2001 | Rhoads et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2001/0051900 A1 | 12/2001 | Fisher et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0072942 A1 | 6/2002 | Kuykendall et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0133445 A1 | 9/2002 | Lessin |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1* | 1/2003 | Risafi ...................... G07F 7/1008 235/380 |
| 2003/0004997 A1 | 1/2003 | Parker et al. |
| 2003/0017865 A1 | 1/2003 | Beaulieu et al. |
| 2003/0018568 A1 | 1/2003 | Chen |
| 2003/0053609 A1 | 3/2003 | Risafi et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0120553 A1 | 6/2003 | Williams |
| 2003/0135459 A1 | 7/2003 | Abelman et al. |
| 2003/0144935 A1 | 7/2003 | Sobek |
| 2003/0150142 A1 | 8/2003 | Street |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0122736 A1* | 6/2004 | Strock ...................... G06Q 30/02 705/14.31 |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0158522 A1 | 8/2004 | Brown et al. |
| 2004/0167821 A1 | 8/2004 | Baumgartner |
| 2004/0181481 A1 | 9/2004 | Carter |
| 2004/0188221 A1 | 9/2004 | Carter |
| 2004/0199463 A1 | 10/2004 | Deggendorf |
| 2004/0205138 A1 | 10/2004 | Friedman et al. |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2004/0249752 A1 | 12/2004 | Prato et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0049974 A1 | 3/2005 | Jani et al. |
| 2005/0060257 A1 | 3/2005 | Fry |
| 2005/0071230 A1* | 3/2005 | Mankoff ........... G06F 17/30011 705/14.15 |
| 2005/0075939 A1 | 4/2005 | Bao et al. |
| 2005/0077350 A1 | 4/2005 | Courtion et al. |
| 2005/0082364 A1 | 4/2005 | Alvarez et al. |
| 2005/0108121 A1 | 5/2005 | Gravett et al. |
| 2005/0108164 A1 | 5/2005 | Salafia, III et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Algiene |
| 2005/0211765 A1 | 9/2005 | Brown et al. |
| 2005/0228724 A1 | 10/2005 | Frangiosa |
| 2005/0247798 A1 | 11/2005 | Graves et al. |
| 2005/0273430 A1 | 12/2005 | Pliha |
| 2005/0274798 A1 | 12/2005 | Bacastow |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0054682 A1 | 3/2006 | De La Huerga |
| 2006/0059085 A1 | 3/2006 | Tucker |
| 2006/0074804 A1 | 4/2006 | Cinar |

(56) References Cited

U.S. PATENT DOCUMENTS

| | | |
|---|---|---|
| 2006/0085269 A1 | 4/2006 | Guilfoyle |
| 2006/0085334 A1 | 4/2006 | Murphy |
| 2006/0100914 A1 | 5/2006 | Jafri et al. |
| 2006/0113376 A1 | 6/2006 | Reed et al. |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0210753 A1* | 9/2006 | Kadlec ............ B32B 5/022 428/41.8 |
| 2006/0212392 A1 | 9/2006 | Brown |
| 2006/0212393 A1 | 9/2006 | Brown |
| 2006/0224502 A1 | 10/2006 | McGowan |
| 2006/0247975 A1 | 11/2006 | Shapiro et al. |
| 2006/0249570 A1 | 11/2006 | Seifert et al. |
| 2006/0249870 A1 | 11/2006 | Tachauer |
| 2006/0259364 A1* | 11/2006 | Strock ............ G06Q 30/02 705/14.15 |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293947 A1* | 12/2006 | Nicholson ....... G06Q 30/0226 705/14.32 |
| 2006/0293966 A1 | 12/2006 | Inouye |
| 2007/0000997 A1 | 1/2007 | Lambert et al. |
| 2007/0005416 A1* | 1/2007 | Jackson ............ G06Q 30/02 705/14.15 |
| 2007/0011089 A1 | 1/2007 | Deschryver |
| 2007/0038515 A1* | 2/2007 | Postrel ............ G06Q 20/06 705/14.3 |
| 2007/0038924 A1 | 2/2007 | Beyer et al. |
| 2007/0045401 A1 | 3/2007 | Sturm |
| 2007/0061206 A1 | 3/2007 | Lefebvre |
| 2007/0061248 A1 | 3/2007 | Shavit et al. |
| 2007/0075134 A1 | 4/2007 | Perlow et al. |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0192237 A1 | 8/2007 | Duoos et al. |
| 2007/0194113 A1* | 8/2007 | Esplin ............ G06Q 20/10 235/383 |
| 2007/0198352 A1 | 8/2007 | Kannegiesser |
| 2007/0198354 A1* | 8/2007 | Senghore ........ B01J 23/6562 705/14.32 |
| 2007/0198403 A1 | 8/2007 | Aloni et al. |
| 2007/0215699 A1 | 9/2007 | Arego et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0252010 A1 | 11/2007 | Gonzalez et al. |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2007/0288354 A1 | 12/2007 | Leclair et al. |
| 2008/0005001 A1 | 1/2008 | Davis et al. |
| 2008/0021772 A1* | 1/2008 | Aloni ............ G06Q 20/10 705/14.27 |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059306 A1* | 3/2008 | Fordyce ............ G06Q 30/02 705/14.27 |
| 2008/0059363 A1 | 3/2008 | Hotz et al. |
| 2008/0065532 A1 | 3/2008 | De La Motte |
| 2008/0082418 A1* | 4/2008 | Fordyce ............ G06Q 30/02 705/14.34 |
| 2008/0091519 A1 | 4/2008 | Foss |
| 2008/0103627 A1 | 5/2008 | Torian |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0140576 A1 | 6/2008 | Lewis et al. |
| 2008/0154702 A1 | 6/2008 | Pleban |
| 2008/0162271 A1 | 7/2008 | Benjamin |
| 2008/0162337 A1 | 7/2008 | Greenland et al. |
| 2008/0195541 A1 | 8/2008 | Battaglini et al. |
| 2008/0197192 A1 | 8/2008 | Lindahl et al. |
| 2008/0210753 A1* | 9/2008 | Plozay ............ G06Q 30/02 235/380 |
| 2008/0228582 A1* | 9/2008 | Fordyce ............ G06Q 30/02 705/14.27 |
| 2008/0228643 A1 | 9/2008 | Hall |
| 2008/0235095 A1 | 9/2008 | Oles et al. |
| 2008/0270163 A1 | 10/2008 | Green |
| 2008/0270298 A1 | 10/2008 | McElroy et al. |
| 2008/0270304 A1 | 10/2008 | Brown et al. |
| 2008/0281692 A1* | 11/2008 | Zhang ............ G06Q 20/10 705/14.16 |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2008/0314996 A1 | 12/2008 | Smith |
| 2008/0319868 A1 | 12/2008 | Briscoe et al. |
| 2009/0006203 A1 | 1/2009 | Fordyce, III et al. |
| 2009/0048923 A1* | 2/2009 | Seven ............ G06Q 20/387 705/14.17 |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1* | 3/2009 | Schmeyer ........ G06Q 10/02 705/64 |
| 2009/0078757 A1 | 3/2009 | Hanson et al. |
| 2009/0089205 A1 | 4/2009 | Bayne |
| 2009/0094125 A1 | 4/2009 | Killian et al. |
| 2009/0099064 A1 | 4/2009 | Calderon-Gonzalez |
| 2009/0112761 A1 | 4/2009 | Robertson et al. |
| 2009/0134218 A1 | 5/2009 | Yuzon et al. |
| 2009/0138396 A1 | 5/2009 | Boal |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers et al. |
| 2009/0171775 A1 | 7/2009 | Cashion, Jr. et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2009/0254484 A1 | 10/2009 | Forero et al. |
| 2009/0265241 A1* | 10/2009 | Bishop ............ G06Q 20/02 705/14.38 |
| 2010/0012721 A1 | 1/2010 | Jain et al. |
| 2010/0017278 A1 | 1/2010 | Wilen et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0114743 A1 | 5/2010 | Misraje et al. |
| 2010/0123006 A1 | 5/2010 | Chen |

(56) References Cited

U.S. PATENT DOCUMENTS

| | | | |
|---|---|---|---|
| 2010/0153273 A1* | 6/2010 | Sellars | G06Q 20/02 705/67 |
| 2010/0174584 A1* | 7/2010 | Tiezten | G06Q 30/02 705/14.27 |
| 2010/0222132 A1 | 9/2010 | Sanford et al. | |
| 2010/0280921 A1 | 11/2010 | Stone et al. | |
| 2010/0280949 A1 | 11/2010 | Van Rensburg | |
| 2010/0306104 A1 | 12/2010 | Johnson | |
| 2010/0312684 A1 | 12/2010 | Kemper et al. | |
| 2011/0047039 A1 | 2/2011 | Crames et al. | |
| 2011/0054981 A1* | 3/2011 | Faith | G06Q 30/02 705/7.36 |
| 2011/0082737 A1* | 4/2011 | Crowe | G06Q 30/02 705/14.27 |
| 2011/0093323 A1 | 4/2011 | Prus et al. | |
| 2011/0106698 A1 | 5/2011 | Isaacson et al. | |
| 2011/0112956 A1 | 5/2011 | Ling et al. | |
| 2011/0112957 A1 | 5/2011 | Ingram et al. | |
| 2011/0124390 A1 | 5/2011 | Wilen | |
| 2011/0153462 A1 | 6/2011 | Granich | |
| 2011/0270664 A1 | 11/2011 | Jones | |
| 2011/0282784 A1 | 11/2011 | Nelsen | |
| 2012/0047003 A1* | 2/2012 | Hammad | G06Q 30/0207 705/14.1 |
| 2012/0095820 A1* | 4/2012 | Chandrasekaram | G06Q 30/02 705/14.23 |
| 2012/0123827 A1 | 5/2012 | Dooley et al. | |
| 2012/0271697 A1 | 10/2012 | Gilman et al. | |
| 2012/0271733 A1 | 10/2012 | Brooks | |
| 2013/0124277 A1 | 5/2013 | Dooley et al. | |
| 2013/0124429 A1 | 5/2013 | Zou et al. | |
| 2013/0132169 A1 | 5/2013 | Dooley et al. | |
| 2013/0159184 A1 | 6/2013 | Thaw | |
| 2013/0173407 A1 | 7/2013 | Killian et al. | |
| 2013/0246220 A1* | 9/2013 | Hammad | G06Q 30/0639 705/26.9 |
| 2013/0297431 A1 | 11/2013 | Deubell et al. | |
| 2013/0304642 A1 | 11/2013 | Campos | |
| 2014/0032381 A1 | 1/2014 | Killian et al. | |
| 2014/0076978 A1 | 3/2014 | Smith et al. | |
| 2014/0108125 A1 | 4/2014 | Maraz et al. | |
| 2014/0122327 A1 | 5/2014 | Aleles et al. | |
| 2014/0172596 A1* | 6/2014 | Ten Cate | G06Q 20/027 705/16 |
| 2015/0120418 A1* | 4/2015 | Cervenka | G06Q 30/0222 705/14.23 |
| 2015/0220958 A1* | 8/2015 | Tietzen | G06Q 30/0226 705/14.15 |
| 2015/0278801 A1 | 10/2015 | Friedlander | |
| 2015/0317619 A1 | 11/2015 | Curtis | |
| 2016/0125698 A1 | 5/2016 | Dewaal | |
| 2016/0203473 A1 | 7/2016 | Curtis | |
| 2017/0124586 A1 | 5/2017 | Tepper et al. | |

FOREIGN PATENT DOCUMENTS

| | | |
|---|---|---|
| EP | 0348932 A2 | 5/1995 |
| JP | 02-238593 A | 9/1990 |
| JP | 02-278495 A | 11/1990 |
| JP | 03-100791 A | 4/1991 |
| JP | 04-165588 A | 6/1992 |
| KR | 20100010217 A | 2/2010 |
| WO | 1986/02757 A1 | 5/1986 |
| WO | 1986/07647 A1 | 12/1986 |
| WO | 1988/03297 A1 | 5/1988 |
| WO | 1989/08899 A1 | 9/1989 |
| WO | 1991/09370 A1 | 6/1991 |
| WO | 1993/09515 A1 | 5/1993 |
| WO | 1994/10649 A1 | 5/1994 |
| WO | 1994/28498 A1 | 12/1994 |
| WO | 1995/03570 A2 | 2/1995 |
| WO | 1997/46986 A1 | 12/1997 |
| WO | 0060487 A1 | 10/2000 |
| WO | 2007133315 A2 | 11/2007 |
| WO | 2008102329 A2 | 8/2008 |
| ZA | 200709282 | 10/2007 |

OTHER PUBLICATIONS

IBM 4680-4690 Advanced Payment System for Supermarket Application User's Guide, Sep. 1996 (222 pages).

IBM 4680-4690 Supermarket Application—Electronic Funds Transfer Feature Enhancement: User's Guide, IBM Corp., Research Triangle Park, NC, Sep. 1995 (318 pages).

International Search Report, PCT/US08/87689, dated Jun. 17, 2009.

International Search Report, PCT/US09/34692, dated Apr. 14, 2009.

International Search Report, PCT/US09/39492 dated May 14, 2009.

International Search Report, PCT/US09/39495, dated May 18, 2009.

International Search Report, PCT/US09/39504, dated May 27, 2009.

International Search Report, PCT/US09/39512, dated Jun. 8, 2009.

International Search Report, PCT/US09/43978, dated Jun. 30, 2009.

International Search Report, PCT/US09/43988 dated Jul. 14, 2009.

International Search Report, PCT/US09/56072, dated Oct. 20, 2009.

Intralinks, Inc. Begins European Rollout of Its Proven Electronic Solution for Loan Syndication, London (Business Wire), Oct. 8, 1997, 4 pages.

Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.

Jones, Tim, Paradigms lost, RSA Journal, Oct. 2006, pp. 28-31.

Klein, Robert J., Here Comes the Debit Card, D&B Reports, Jul./Aug. 1990 (2 pages).

Krino et al., A Birthday Card That Pays Off, the Orange County Register, Jul. 19, 1996 (2 pages).

Lazarus, David, 120% rate for Wells' Advances, Oct. 16, 2004, San Francisco Chronicle.

Letter of Credit Explained: What is Letter of Credit?, Dec. 26, 2005, 2 pages.

Mannix, Margaret, Checkout Tech, U.S. News and World Report, Feb. 27, 1995 (6 pages).

MasterCard Electronic prepaid (Oct. 2003). The Nilson Report, (798), (Dec. 9, 2011), The Banking Source (Document ID 474833171).

MICROTRAX Electronic Payment Systems: The MicroTrax Pinstripe Lane Equipment Users Guide, MicroTrax Ltd., Newport Beach, CA, 1991 (54 pages).

MICROTRAX LTD. Omni 490M (and 490ML) Operation Manual for Integrated and Non-Integrated Configurations, 1994 (60 pages).

MICROTRAX LTD., PC Electronic Payment Systems Reference Manual; 1995 (381 pages).

NCR 4430-5000 MSR/PIN User's Guide, 1994 (265 pages).

Neiman Marcus Express Card Advertisement, The New Yorker, Dec. 12, 1994 (3 pages).

Neiman Marcus to Launch NM Express Automated Gift Card, PR Newswire, Nov. 22, 1994 (1 page).

Nieman Marcus Offers Electronic Gift Certificate, Card Fax, Jan. 23, 1995 (1 page).

Nieman Marcus: High-Tech for the Holidays, ADWEEK, Dec. 5, 1994 (1 page).

Notice of Allowance for co-pending U.S. Appl. No. 12/338,440 dated Sep. 13, 2013.

Notice of Allowance for co-pending U.S. Appl. No. 12/417,162 dated Oct. 1, 2012.

Office Action for co-pending U.S. Appl. No. 12/367,187 dated Aug. 1, 2013.

Office Action for co-pending U.S. Appl. No. 12/397,113 dated Oct. 15, 2013.

O'Keefe, Michael, Portable POS Debit Terminal Mean Greater Convenience, Bank Systems & Technology, Nov. 1994 (2 pages).

Omni 480/490 Programmer's Guide, VeriFone Part No. 12924—Revision A, Manual Revision 1.0, Oct. 1993 (228 pages).

One Company's Diversification Shakes Up Peripherals Market, Chain Store Age, Jun. 1996 (3 pages).

(56) References Cited

OTHER PUBLICATIONS

Orszag, Peter, Unemployment Insurance as an Economic Stimulus, Center for Budget and Policy Priorities, Nov. 15, 2011.
Parrott, James, Jittery Wall Street, Calm City?, Gotham Gazette, Apr. 16, 2007.
Peppard, Alan, Down and Dirty in Deep Ellum, The Dallas Morning News, Dec. 3, 1994 (2 pages).
POS Terminal Can Handle Direct Debits, ABA Banking Journal, Sep. 1984 (2 pages).
Powell, Robert L., Statewide Electronic Commerce Program Status Report, State of North Carolina Office of the State Controller, Mar. 7, 2007.
Prosper, Access and Transparency through Person-to-Person Lending, FDIC Advisory Committee on Economic Inclusion, Mar. 28, 2007.
Pyatt, Rudolph A., Jr., Mobil Stations to Permit Use of Bank Cards, The Washington Post (1 page).
Racal Corp. Advertisement, POS Terminal Eliminates Credit Card Vouchers, ABA Banking Journal, Nov. 1985 (2 pages).
Rumiany, Diego, Internet Bidding for Microcredit: making it work in the developed world, conceiving it for the developing world, Mar. 2007.
Scott et al., The web we weave, Financial World, Nov. 2006, pp. 12-15.
Service Mark Registration No. 1,981,044 for "NM Express Card" registered Jun. 18, 1996 (1 page).
Szabo, Joan C., The Changing World of Financial Services, Nation's Business, Oct. 1994 (7 pages).
United Nations Conference on Trade and Development, E-finance and Small and Medium-Size Enterprises (SMEs) in Developing and Transition Economies, UNCTAD Expert Meeting, Oct. 17, 2001.
VeriFone Everest Advertisement, Stores, May 1995 (2 pages).
Final Office Action for co-pending U.S. Appl. No. 12/389,749 dated Dec. 11, 2014.
Health Savings Account (HSA): Horizon Blue Cross Blue Shield of New Jersey, Small Employer Guide, Jan. 2006, 18 pages.
Kent FOC Newsletter, retrieved at www.accesskent.com/Courts/FOC/pdfs/newsletter/022006.pdf, Feb. 2006, 1 page.
Office Action for co-pending U.S. Appl. No. 12/397,113 dated Nov. 3, 2014.
Office Action for co-pending U.S. Appl. No. 12/626,349 dated Dec. 12, 2014.
Office Action for co-pending U.S. Appl. No. 12/731,852 dated Nov. 10, 2014.
Office Action for co-pending U.S. Appl. No. 12/892,847 dated Nov. 5, 2014.
Office Action for co-pending U.S. Appl. No. 13/036,076 dated Jan. 29, 2015.
Office Action for co-pending U.S. Appl. No. 13/232,700 dated Jan. 29, 2015.
Office Action for co-pending U.S. Appl. No. 13/287,725 dated Sep. 26, 2013.
Office Action for co-pending U.S. Appl. No. 13/450,617 dated Oct. 28, 2014.
Office Action for co-pending U.S. Appl. No. 13/782,550 dated Dec. 17, 2014.
Office Action for co-pending U.S. Appl. No. 14/071,386 dated Dec. 16, 2014.
Caskey et al., Is the Debit Card Revolution Finally Here?, Federal Reserve Bank of Kansas City, Economic Review; Fourth Quarter 1994; vol. 79 #4; pp. 70-95.
Castaneda, Laura, Business Promote Services to Customers Day in and Day Out, The Dallas Morning News, Nov. 26, 1994 (3 pages).
Coady et al., Targeted anti-poverty intervention: A selected annotated bibliography, World Bank, Apr. 2002.
Downes, How to avoid exchange charges Wasting Money A foreign currency bank account could be the answer, The Daily Telegraph, London (UK), Mar. 10, 2007.

Mangu-Ward, Payday of Reckoning, Reason, 41(5), Oct. 2009, pp. 40-47, retrieved Jun. 15, 2012, from Research Library (Document ID:1861658171).
99Bill Launches Installment Credit Services, PR Newswire, Aug. 21, 2008, 2 pages, retrieved Jul. 9, 2012, from Business Dateline (Document ID: 1536854041).
Avoid Gift Card Pitfalls, ConsumerReports.org.
Bank Deals—Best Rates and Deals: EverBank's World Currency CDs—My Interview with EverBank's Executive Frank Trotter, http://bankdeals.blogspot.com, Jul. 29, 2007.
Bank of Boulder POS Debit Solution at the Table Now in Beta: First Bank to Certify IVI Spirit C2000 on MAPP (R), Business Wire, Aug. 3, 1994 (1 page).
Barnes, David B., VeriFone Introduces Everest (TM) Customer Activated Payment System to Multi-lane Retail Market, PR Newswire, Feb. 20, 1995 (2 pages).
Blair et al., Challenges to the Dual Banking System: The Funding of Bank Supervision, FDIC Bank Review, Mar. 31, 2006.
Brown, Suzanne, Goodnight Amy, Meg, Beth and Jo, Rocky Mountain News, Dec. 8, 1994 (1 page).
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).
Check Cashers Move Into Cards, Accounts (Cover Story), ATM & Debit News [serial online], Apr. 20, 2006, 6(24), pp. 1-3, available from Business Source Complete, Ipswich, MA.
Cohen, Bruce, Alternative to Cash Gains Ground, The Financial Post, Apr. 22, 1994 (2 pages).
Coleman, Richard W., Is the Future of the Microfinance Movement to be Found on the Internet?, International Trade and Finance Association Working Papers 2007.
Congressional Budget Office, "Emerging Electronic Methods for Making Payments" (Jun. 1996), CBO.
Credit Terminals to be Used at Canadian Liquor Outlets, Card News, Jan. 23, 1995 (1 page).
Cross, Sam Y., All About . . . the Foreign Exchange Market in the United States, Federal Reserve Bank of New York, 1998.
Debit Card Popularity on the Rise, Chain Store Age Executive, Jan. 1994 (1 page).
Debit Goes to Dinner, Credit Card Management, New York, Oct. 1994 (2 pages).
Developing Asia and the World, Asian Development Bank, 2002.
Everest Reference Manual, VeriFone Part No. 25399, Revision A, Manual Revision 1.0, Jul. 1995 (66 pages).
Express Cards and Trains, Chain Store Age Executive Edition, Jan. 1995 (1 page).
Final Office Action for co-pending U.S. Appl. No. 12/338,684 dated Sep. 23, 2011.
Final Office Action for co-pending U.S. Appl. No. 12/626,349 dated Jul. 20, 2012.
Final Office Action for co-pending U.S. Appl. No. 12/731,852 dated Apr. 5, 2012.
Final Office Action for co-pending U.S. Appl. No. 12/877,524 dated Jun. 8, 2012.
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/232,700 dated Oct. 12, 2012.
Final Office Action for co-pending U.S. Appl. No. 13/349,290 dated Mar. 14, 2013.
Financial Advice Investment Money, HSBC Offshore Internet Banking, Oct. 1, 2009 at 5:50pm.
Financial Advice Investment Money, HSBC Offshore Internet Banking, Oct. 1, 2009 at 7:25am.
Flannery, Matt, Kiva and the Birth of Person to Person Microfinance, Innovations, Winter & Spring 2007, pp. 31-56.

(56) References Cited

OTHER PUBLICATIONS

Foreign Exchange Market, http://en.wikipedia.org.
Fox, Linda A., Keep an Eye on Your Credit Card, The Toronto Sun, Aug. 9, 1996 (1 page).
Garriss, J., (2004), Forging an ideal HSA, Workspan, 47(5), 18-25, Retrieved Sep. 3, 2013.
Heng et al., Implications of Web 2.0 for financial institutions: Be a driver, not a passenger, Munich Personal RePEc Archive, Jul. 31, 2007.
Hulme et al., Internet Based Social Lending: Past, Present and Future, Social Futures Observatory, Oct. 2006.
Hypercom S7C Advertisement, Chain Store Age, Sep. 1995 (4 pages).
Hypercom S7SC Advertisement, Chain Store Age, Feb. 1996 (2 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (429 pages).
IBM 4680-4690 Advanced Payment System for Chain Drug Sales Application User's Guide, Jul. 1996 (248 pages).
IBM 4680-4690 Advanced Payment System for Chain Drug Sales Application User's Guide, Nov. 1996 (256 pages).
Office Action for co-pending U.S. Appl. No. 12/626,349 dated Nov. 27, 2013.
VeriFone Folio (TM) Brings Credit and Debit Card Payment to the Restaurant Table, PR Newswire, May 16, 1994 (3 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483—Revision D, Manual Revision 3.01, Apr. 1990 (144 pages).
VIPGift Receives Investment From Summit Partners and Bridgescale Partners, Chattanooga, TN and Palo Alto, CA, Nov. 1, 2008.
Wolf, Alan Steven, What to do when the Chain Breaks, Servicing Management, Feb. 1997, 3 pages.
Wolf, File History of US 2005/0278347.
Wolfe, Daniel, An E-Variation on Payday Loan Theme, American Banker, Jul. 28, 2005.
Zandi, Mark, Washington Throws the Economy a Rope, Moody's Economy.com, Jan. 22, 2008.
Zubko, N., An Automatic Connection Electronic Transaction Tools Help Manufacturers Connect With Suppliers to Streamline Sourcing Efforts, Industry Week, vol. 257, No. 7, Jul. 2008, pp. 26-27.
Final Office Action for co-pending U.S. Appl. No. 12/367,187 dated Feb. 12, 2014.
Final Office Action for co-pending U.S. Appl. No. 12/892,847 dated Aug. 12, 2014.
Hori et al. "Did the Shopping Coupon Program Stimulate Consumption? Evidence from Japanese Micro Data" ESRI Discussion Paper Series No. 12, Apr. 2002, 45 pages.
Office Action for co-pending U.S. Appl. No. 12/367,187 dated Sep. 24, 2014.
Office Action for co-pending U.S. Appl. No. 12/389,749 dated Oct. 3, 2014.
Office Action for co-pending U.S. Appl. No. 13/287,725 dated Aug. 25, 2014.
Office Action for co-pending U.S. Appl. No. 13/287,725 dated Jan. 17, 2014.
Office Action for co-pending U.S. Appl. No. 13/349,290 dated Oct. 22, 2014.
Office Action for co-pending U.S. Appl. No. 13/450,617 dated May 12, 2014.
Office Action for co-pending U.S. Appl. No. 13/782,550 dated Sep. 12, 2014.
Office Action for co-pending U.S. Appl. No. 13/863,578 dated Sep. 30, 2014.
Bruene "Expensify Launches Decoupled Credit/Debit Card Using Prepaid Model" retrieved at www.netbanker.com/2008/09/expensify_launches-decoupled_credit_debit_card-using_prepaid_model.html, Sep. 11, 2008, 3 pages.
Business Debit Card Agreements; 3 pages; May 2004.
FDIC, FDIC Law, Regulations, Related Acts—consumer Protection by FDIC; 10 pages. Oct 2005.
Film Financing Models: Rewards Against All Odds Are Varied, Video Age International, vol. 31, No. 5, Oct. 2011, 3 pages.
TreasurySoftware.com; published Jan. 17, 2006 at the website: http://www.treasuresoftware.com:80/ach_file_format_html; 5 pages.

\* cited by examiner

COMPUTER-IMPLEMENTED METHODS, COMPUTER PROGRAM PRODUCTS, AND MACHINES FOR MANAGEMENT AND CONTROL OF A LOYALTY REWARDS NETWORK

This application is a continuation of and claims priority to the benefit of U.S. patent application Ser. No. 12/892,847, filed Sep. 28, 2010, titled "Computer-Implemented Methods, Computer Program Products, and Systems for Management and Control of a Loyalty Rewards Network" which claims priority and is related to U.S. Provisional Patent Application No. 61/246,391, filed Sep. 28, 2009 titled "Computerized Management and Control of Customer Loyalty Rewards Network, Associated Systems and Computer program Products" and U.S. Utility application No. 12/626,349, filed Nov. 25, 2009 titled "Machine, Methods, And Program Product For Electronic Inventory Tracking", each of which are incorporated herein by reference in their entirety.

BACKGROUND

1. Field of Invention

The present invention relates generally to the computerized management and control of databases regarding customer retail sales of goods and services. More particularly, embodiments of the present invention relate to systems, computer program products, and associated methods to manage and control a loyalty rewards network allowing customers to apply or otherwise use loyalty rewards for payments made for goods or services.

2. Background

Loyalty programs or rewards have been used by merchants and other providers of goods and services, as well as by marketing personnel. Loyalty programs or rewards are the result of structured marketing efforts to reward purchases of goods or services from participating merchants or provider of goods and/or services. Those participating have typically been groups or chains of affiliates of merchants or service providers.

During the course of purchases in a loyalty reward program, data from groups or networks of purchasers is useful and valuable concerning purchasing behavior and trends can be aggregated in some form for analysis and evaluation. The group data assembly or network organizer typically receives certain general demographic and identification information from customers or customers willing to participate in the network at the time customers joins the network.

Membership or participation in the network by a customer is evidenced by what have generally been known as discount cards, club cards or rewards cards. The cards have certain identification and authentication data encoded therein, usually in barcode, magnetic stripe or other form that is easily scanned or read. In some cases, tokens such as key fobs or the like which contain comparable identification and authentication data may be used in place of cards. Data gathered from purchases made by participants is made available in connection with evaluating marketing trends and purchasing behavior.

Existing loyalty reward data has been gathered by various groups or chains of merchant outlets, and by the forms of payment (such as credit card, debit card, cash, or check). The ability to easily track purchasing behavior across multiple merchants separately and independently of the form of payment has been difficult, especially for more niche segments or purchasing types or groups that are not as likely to be able to participate in registered credit card programs.

Assembling data indicative of purchasing behavior has been a very cumbersome process. The assembling often-involved integration with multiple retailers; or assembling and relying on data from only one type of purchase; or was done on a retailer-by-retailer basis. This has made it difficult for a marketer to both aggregate participating locations as well as to create a large pool of users to furnish a reliable and representative database. This has been particularly challenging in connection with what are known in market analysis as "emerging groups". In addition, so far as is known, the data models did not accommodate the ability to create a single consistent branded product that all participating customers could use.

SUMMARY OF INVENTION

In view of the foregoing, various embodiments of the present invention advantageously provide a machine, computer program product, and associated computer-implemented method for managing and controlling of a customer loyalty rewards network. The network, according to the present invention, allows a customer to participate, irrespective of the form of payment, and allows a merchant to participate using an existing financial services electronic payment networks. The network, according to the present invention, allows a marketer to aggregate a base of customers with a single card product that each participant is willing to use, enabling the rapid creation of a targeted base of customers in selected groups. This provides a standard customer product and enables targeting of demographic segments of particular interest without regard to purchase method, which creates a compelling targeting opportunity for marketers.

Applicants have recognized a need for easily tracking purchasing behavior across multiple merchants independently of the type or form of purchase being made. The present invention provides computer systems, computer program products and computer-implemented methods for computerized management and control of a customer loyalty rewards network or database to meet such a need.

Embodiments of the present invention provide a loyalty rewards network that allows participating merchants and financial institutions to provide customers a service that enables a customer to earn loyalty rewards at a point of sale at the time of purchase. Rewards are earned at the point of sale by electronically accessing the computer-implemented network with a loyalty rewards card that is furnished for member customers. The loyalty rewards program provided by the network can be supported by any merchant. The card can be issued at the location of a participating merchant or financial institution.

Embodiments of the invention can include, for example, a computer implemented method to cause a computer to perform the process of determining that a customer is one of the plurality of member customers enrolled in a loyalty rewards networks and for performing the process of transmitting a loyalty rewards action confirmation to the member customer. Embodiments of the computer-implemented method can receive data by the computer from a point of sale about purchases of the customer entitling the customer to obtain loyalty rewards. A determination is then made in the computer that the customer is a member of the loyalty reward network based on the received data. The received data is then stored for the member customers in a loyalty rewards network database accessible to the computer. Loyalty rewards availability information according to the stored loyalty rewards criteria is then sent from the computer to the member customer. Instructions from the customer regarding a selected loyalty rewards action from the availability information are then received by the computer. A loyalty reward action confirmation is then transmitted from the computer based on the instructions received from the customer.

Embodiments of the present include a computer for managing a loyalty rewards network through an existing financial services electronic payment network. The computer can include one or more databases defining a loyalty reward network database that is capable of accumulating electronic data related to purchasing behavior for a plurality of member customers enrolled in the loyalty rewards network. The computer can include, for example, a memory, a processor, and an I/O interface. The computer can include a computer program product, stored in memory and operable on the computer for performing a process of determining that a customer is one of the plurality of member customers enrolled in the loyalty rewards network and for performing the process of transmitting a loyalty reward action confirmation to the member customer.

Embodiments of the present invention can also include a computer program product to execute a set of operations and instructions. The computer program product is stored on the memory of a computer and operable by the computer to cause a computer to perform the process of determining that a customer is one of the plurality of member customers enrolled in the loyalty rewards networks and for performing the process of transmitting a loyalty rewards action confirmation to the member customer. The operation can include, for example, determining availability of a loyalty reward action for the member customer responsive to receiving, via the existing financial services electronic payment network, electronic loyalty reward network data. The data is associated with one or more purchases by the member customer and is accumulated in the loyalty rewards database. The availability of loyalty reward action is determined according to collection parameters stored the loyalty reward database and the received data. The operations, for example, can include implementing one or more of the selected loyalty reward actions responsive to electronically receiving instruction from the member customer, the one or more selected loyalty reward actions being one or more of the determined available loyalty reward action.

BRIEF DESCRIPTION OF DRAWINGS

So that the manner in which the features and benefits of the invention, as well as others that will become apparent, may be understood in more detail, a more particular description of the invention briefly summarized above may be had by reference to the embodiments thereof that are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION OF INVENTION

Figure 1:
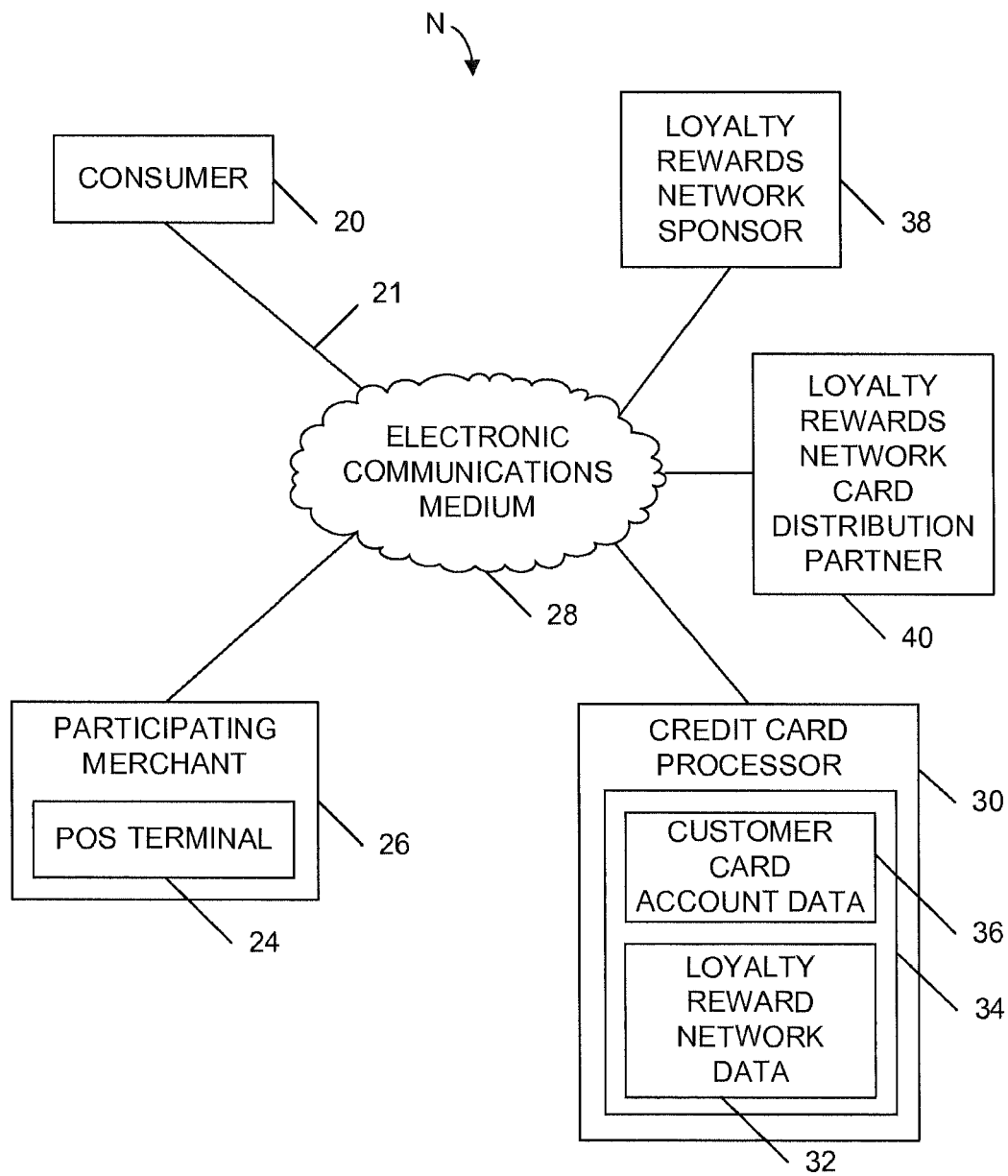
FIG. 1 is a schematic diagram of computers interconnected through an electronics communication network and involved in a computerized customer loyalty rewards network managed and controlled in accordance with the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Existing loyalty rewards networks largely depend on the method of payment such as credit cards, or by type of purchases or merchants. The ability to easily track purchasing behavior across multiple independent merchants irrespective of the method of payment or type of goods or services currently is difficult and cumbersome, especially for customers that are not able to participate in registered credit card programs. Accordingly, embodiments of the present invention advantageously aggregate the purchasing behavior of a base of customers across multiple merchants independent of form of payment or type of goods or services. This enables the rapid creation of a targeted base of customers in selected groups. Embodiments of the present invention provide a standard customer product that enables demographic segments of particular interest to be targeted without regard to purchase method or purchasing type.

Embodiments of the present invention manage and control a loyalty rewards networks by which customers are provided with access to and use of a loyalty rewards network to earn loyalty rewards irrespective of method of payment. Loyalty rewards are gained by simply entering or swiping a loyalty rewards card or token through a reader/sensor before, or at the time, the customer pays for their goods or services from a participating merchant or financial institution. The rewards information can be made available for use, for example, by the customers in the form of a loyalty reward card. The loyalty rewards card, for example, can be associated with a loyalty rewards card number and a member customer. The card may be a tangible, physical card with storage media thereon, or it may take the form of a virtual card in the form of data stored in and accessible from a computer memory or storage device after appropriate security and authentication through code or password identification. The loyalty rewards card is provided to the customers after the customer becomes a member of the loyalty rewards network.

In some embodiments, the loyalty cards are associated with a member customer, or one or more member customers (e.g., husband and wife), and can be used on existing financial services networks. The loyalty rewards card can have, for example, indicia, e.g., logos, slogans, source identifiers, of a loyalty rewards network sponsor and of a credit card processor; a serial number; and expiration date. The structures of various types of specific cards, e.g., magnetic stripe, and types of material are well known to those skilled in the art and can be used with embodiments of the present invention. Typically, a card is formed from plastic and has a magnetic stripe affixed to the plastic through an application of heat. Those skilled in the art will understand that other embodiments besides a magnetic stripe can include radio frequency identification devices (RFID), smart chips, bar codes, and other similar devices.

As one skilled in the art will appreciate, a loyalty rewards card with a magnetic stripe can store information, or data, e.g., account information, by modifying the magnetism of particles on the magnetic stripe on the card. Data can be read by swiping the card through a slot past a reading head of a card reader device, including most point-of-sale hardware. Embodiments of the card can include, for example, two tracks of data on a magnetic card used for transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch. Track 2, as typically encoded, provides for numeric data characters, including up to 19 digits for a primary account number (including a Bank Identification Number ("BIN") as understood by those skilled in the art), an expiration date, a service code, and discretionary verification data, such as, a Personal Identification Number ("PIN"). It should be understood that the loyalty cards need not be in the form of plastic or synthetic resin cards. It is contemplated that the loyalty cards may take other configurations such as tokens, key fobs or other conveniently shaped small articles that are capable of containing comparable identification and authentication data to that used with the present invention.

More specifically, electronic data from a point of sale terminal are received over an electronics communication media or link about purchases made by a customer that entitles the purchaser to loyalty rewards. The received data is analyzed in a computer that manages the loyalty rewards network according to the present invention. The computer determines if the customer is a member of the loyalty rewards network, based on data stored in a loyalty rewards network database stored in machine-readable media and electronically accessible to the computer. If the customer is not a member, the computer can inquire whether or not the customer would like to be a member, and enroll the customer in the loyalty rewards network if the customer desires to become a member. If the customer is a member or becomes a member, the electronic data about purchases are entered and stored in the loyalty rewards network database. An electronic message indicating the nature and type of loyalty rewards available to the customer from the network is then sent from the loyalty rewards network computer over electronics communication links or media to the member customer. The member customer selects one or more of the available loyalty reward actions. For example, an available loyalty reward action can be issuing a gift card (e.g., if the member customer has accumulated $10 dollars in loyalty rewards by purchasing $200 dollars worth of goods, a $10 gift card can be issued). The loyalty rewards network computer applies the loyalty rewards pursuant to the electronically received instructions from the member customer. The loyalty rewards computer implements the one or more selected loyalty rewards actions, and sends an electronic message over the communications link to the customer with confirmation of the loyalty rewards action.

Access to and use of the network, according to the present invention, may be supported by a merchant who is desirous of, and qualified to, become a participating merchant in the loyalty rewards network, and as such is willing to comply with the appropriate terms and conditions of the network. The network is thus available at locations where the network upon which the card is issued is accepted. The invention may be implemented as a computerized process, a computer system, or a computer program product.

Figure 6:
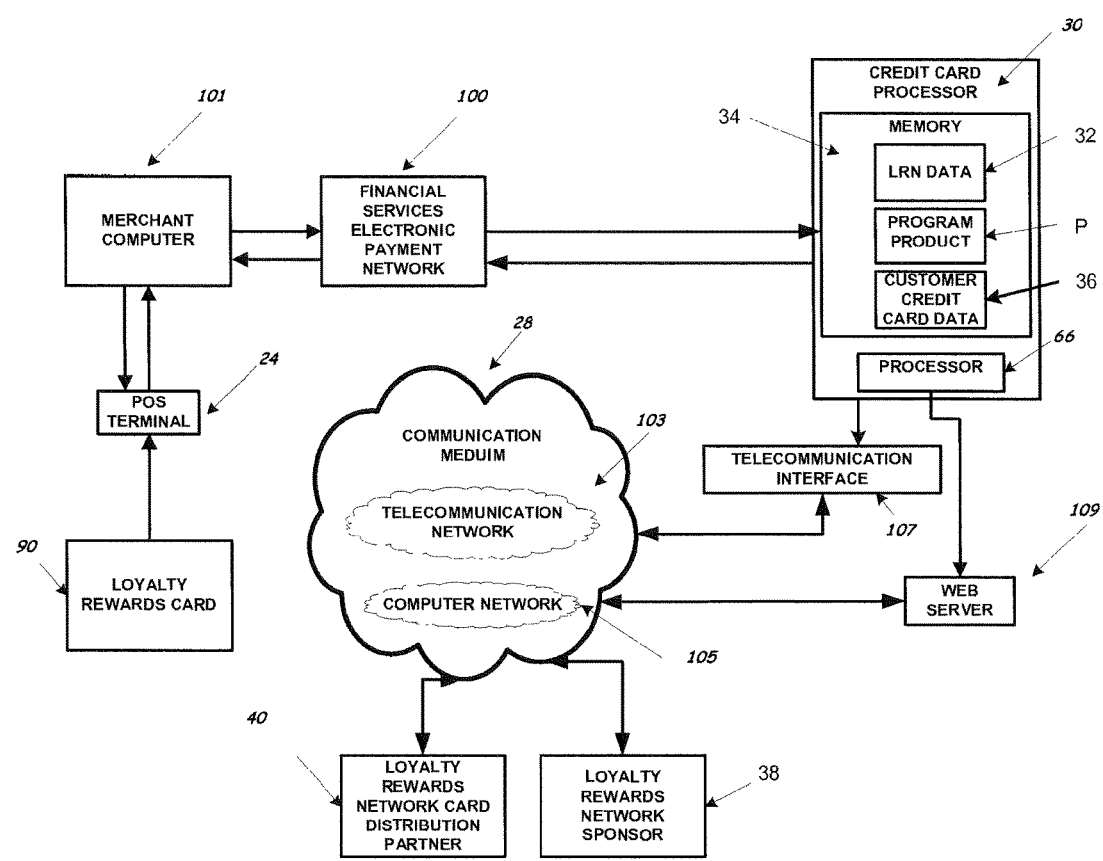
FIG. 6 is a schematic diagram of computers interconnected through a financial services network and involved in a computerized customer loyalty rewards network according to an embodiment of the invention.

A computer 30 for managing and controlling a loyalty rewards network over an existing (traditional) financial services electronic payment network 100 is shown in FIG. 6. The POS terminal 24 receives the payment using the loyalty rewards card 90; a merchant computer 101 for accepting purchasing transaction and facilitating communication of the transaction and associated loyalty rewards data; the financial services electronic payment network 100 provides to identify an issuer associated with the loyalty rewards card 90, an credit card processor computer 30 for processing the transaction and the loyalty rewards data, and for executing the instructions for managing and controlling the loyalty rewards network through communications medium 28. As one skilled in the art will appreciate, the merchant computer 101 and financial services electronic payment network 100 are component of a traditional payment transaction system that enables credit transactions with a merchant, e.g., consumer credit card and debit card systems, and as such, credit card 30 can process payment information in addition to and in conjunction with loyalty rewards network functions of the instant invention.

Communication medium 28 connects the loyalty rewards card 90 to the merchant computer 101, financial services electronic payment network 33, the credit card processor computer 30, the loyalty rewards network card distribution partners 40, and the loyalty rewards network sponsor 38 (though the communications medium 28 is depicted as connecting only the credit card processor computer 30, the loyalty rewards network card distribution partners 40, and the loyalty rewards network sponsor 38). The communication medium 28 can include, for example, a telecommunication network 103, which can include a wire-based telephone network, pager network, cellular network, or a combination thereof, and a computer network 105. As one skilled in the art will appreciate, the computer network 105 can connect all of the system components using a local area network ("LAN") or wide area network ("WAN"), or a combination thereof.

During operation, the loyalty rewards card 90, for example, can connect to the POS terminal 24, which can be, e.g., a terminal at a merchant or, alternatively, a device interface such as a telephone or computer connected to an internet connection. To use the POS terminal 24, and thereby access the credit card processor computer 30, a consumer swipes or otherwise enters order information carried on the loyalty rewards card for goods and/or services.

In a preferred embodiment, the loyalty rewards card number 92 is extracted from the loyalty rewards card 90, and passed to the merchant computer 30 in response to a consumer or merchant swiping or otherwise interfacing a loyalty rewards card 90 with a POS terminal 24, or by entering the loyalty rewards card number 92 directly into the POS terminal 24 via keypad (not shown). Once the POS terminal 24 receives the loyalty rewards card number 92, and any other data that may be stored in the storage medium, from the loyalty rewards card 90, the POS terminal 24 may append time of sale data thereto for transmission, i.e., and any additional transaction information such as the transaction date, transaction time, merchant identification, etc., and thereby assemble the loyalty rewards data. The loyalty rewards data is then encrypted and transmitted through the communications medium 28 to the merchant computer 101. The merchant computer is both configured and positioned in communication with the credit card processor computer 30 through the financial services electronic payment network 100, and decrypts the loyalty rewards data, including the loyalty rewards card number 92, and appends additional data, such as the merchant acquirer identification, there to for transmission of the purchase transaction message to the financial services electronic payment network 100. As one skilled in the art will recognize, in addition to transmitting the loyalty rewards network card 92, the merchant could also transmit settlement data to the payment network so that the merchant or can receive payment in conjunction with available loyalty rewards network action. To perform these duties, merchant computer 101, for example, consists of at least one computer, though it can be implemented as one or more computers each having a processor and memory coupled to the processor to store operating instructions therein, which can be configured in the form of a server.

The merchant computer 101 transmits the loyalty rewards data, including the loyalty rewards card number 92, to the financial services electronic payment network 100, which operates to set transaction rules, facilitate transactions, settles funds between parties, engages in risk mitigation etc. Examples of payment networks 100 are e.g., MasterCard®, Visa®, American Express®, or Discover® network. At the financial services electronic payment network 100, the loyalty rewards data is decrypted so that the credit card processor can be identified and the loyalty rewards data is then routed to the appropriate credit card processor computer 30. The financial services electronic payment network 100 can be configured as one or more computers each having a processor and memory coupled to the processor to store operating instructions therein, which can be configured in the form of a server.

As shown in FIG. 6, the credit card processor 30 can, for example, connect to the communication medium 28 via telecommunications interface 107 and web server 109.

As shown in FIG. 6 telecommunications interface 107 allows a loyalty rewards card 90, loyalty rewards network card distribution partner 40, loyalty rewards network sponsor 38, a merchant computer 101, or a customer 20, to connect to the credit card processor 30. As one skilled in the art will appreciate, web server 109 provides the payment network 100, merchant computers 101, loyalty rewards network card distribution partners 40, loyalty rewards network sponsors 38, and networked computers access to the credit card processor computer 30, and is used to manage computer traffic to and from the credit card processor computer 30. As such, web server 109 is configured with processors, memory, and I/O devices to allow efficient exchange of data between the credit card processor 30, its related components and the financial services electronic payment network 100 to facilitate the web functions thereof.

As further illustrated in FIG. 1, a loyalty rewards network system includes a communication medium 28 that connects a customer 20, a participating merchant 26 (connected e.g. to merchant computer 101), a credit card processor computer 30, a loyalty rewards network card distribution partner 40, and a loyalty rewards network sponsor 38 participating in the loyalty rewards network N. The participating merchant 26 has associated therewith a point of sale ("POS") terminal 24 for interacting with a customer and a loyalty rewards card 90 via e.g., the merchant computer 101. The POS terminal 24 can be, e.g., a terminal at a merchant or, alternatively, a device interface such as a telephone or computer connected to an internet connection, and initiates a purchase. The POS terminal 24 can include a keypad so that a customer can enter an electronic order card number; a barcode scanner (so the merchant can scan a barcode associated with the order, a product, or the loyalty rewards card); and a magnetic stripe reader/slot (so the merchant or customer can scan a magnetic stripe on the loyalty reward card). The reader/slot is a convention reader that can also read, for example, credit cards. Alternative embodiments of the POS terminal can include an RFID interface and/or a contact memory button reader. The POS terminal, further includes various software and hardware for interfacing with a financial services electronic payment network, and a credit card processor computer 30, as known and understood by those skilled in the art. For example, the POS terminal may include a computer display screen (not shown) for displaying transaction data, a computer memory such RAM, ROM and related hard disk storage for storing transaction data or computer instructions, a computer processor for executing computer instruction, and associated buses for data input and output, including those to connect the POS terminal 24 to the communications medium 28 for interaction with the credit card processor computer 30. As such, the POS terminal 24 may be one of the available type from vendors Hypercom, Verifone, Lipman Nurit, Ingenico, and the like; or by keying the traditional Network 16-digit card number (with or without the security code) into a traditional or web-based POS terminal, over a land-based or cellular telephone or using other electronic transmission technology, e.g., RFID.

Figure 5:
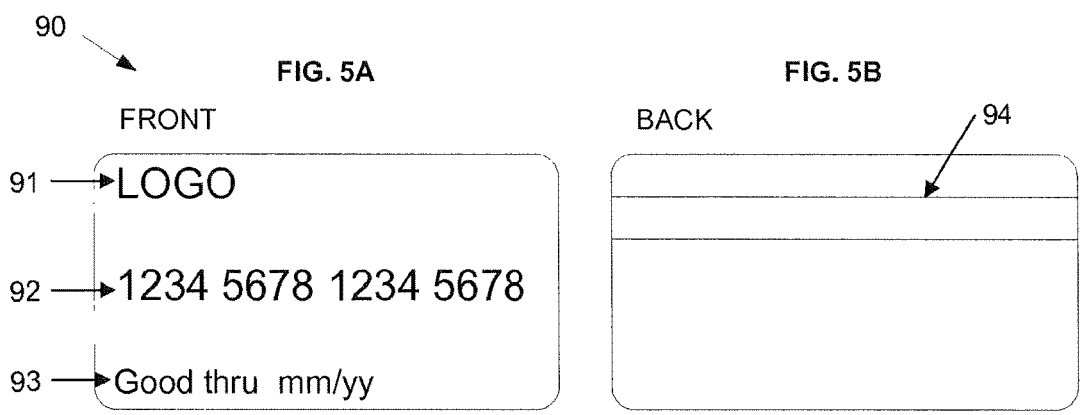
FIG. 5A is a front view of a loyalty rewards card for use in a loyalty rewards network according to embodiments of the present invention.
FIG. 5B is a back view of a loyalty rewards card for use in a loyalty rewards network according to embodiments of the present invention.

The loyalty rewards card adapted to interface with the POS terminal 24. In such embodiments, as illustrated in FIGS. 5A and 5B, the present invention may associate, for example, with the loyalty rewards network card 90 with the member consumer. As understood by those skilled in the art, a loyalty rewards network card 90 can have indicia 91, e.g., logos, slogans, source identifiers, of a sponsoring bank and of a loyalty rewards network card processor; a serial number 92; and expiration date 93. The structures of various types of specific cards, e.g., magnetic stripe 94, and types of material are well known to those skilled in the art and can be used with embodiments of the present invention. Typically, a card 90 is formed from plastic and has a magnetic stripe 94 affixed to the plastic through an application of heat. Those skilled in the art will understand that other embodiments besides a magnetic stripe can include radio frequency identification devices (RFID), smart chips, bar codes, and other similar devices. Embodiments of the present invention can include forming cards or having a customer purchase, otherwise convert, or receive cards already formed.

The participating merchant 26 of the loyalty rewards networks may also accept payment in a variety of forms such as cash, credit card, debit card, or check for the goods or services upon which loyalty rewards will be offered. In the process of the customer paying for the goods or services, the customer may also offer his or her credit card to the merchant, who swipes that card through its POS terminal 24, enters the purchase price amount into terminal 24 or an associated data input keypad or the like, and presses a transmit key (normally, the "credit" button) to send a point of sale or POS message to the credit card processor 30 through the merchant computer 101 (FIG. 6) and communication medium 28. In addition to the payment transaction, the merchant may allow the customer to also initiate a loyalty rewards network transaction by allowing the customer to also swipe its loyalty rewards card—or in a simplified embodiment, the loyalty rewards card is integrated with the customer's credit card to simplify the transaction steps. Alternatively, the customer may offer its loyalty rewards card to the merchant and pay cash for the goods or services. In such instances, a message passed through the POS terminal may include a message for a zero charge, or some other identifier indicating that the message is a loyalty rewards message not a credit message. As one skilled in the art will appreciate, though not all possible combinations of methods for a customer to interact with the POS terminal to access the loyalty rewards network are described herein, all such configurations are within the scope of the present invention.

Moreover, customers use their respective physical or virtual cards in one of several ways, e.g., swiping the physical card or in a traditional point-of-sale ("POS") terminal, as shown schematically at 24, or by accessing the rewards network though a personal computer. Rather than using the actual card number, some businesses may choose to use some other identifier that is uniquely associated with the card number for verification/security purposes to gain access to the computerized loyalty rewards network. Such embodiments may be beneficial for use as, e.g., a code entered on a merchant's website, etc.

As previously mentioned, the loyalty rewards network data from the POS terminal is routed through the traditional (i.e., existing) financial services electronic payment networks (e.g., MasterCard®, Visa®, Discover®, American Express®) via the communication medium 28 to the credit card processor computer 30. The credit card processor computer 30 analyzes the loyalty rewards network message to verify the identity and membership of the customer in the loyalty rewards network. The credit card processor computer analyzes the loyalty rewards network data to determine one or more of the following: loyalty rewards card number, card security code, merchant category code ("MCC"), merchant name, merchant identification number, terminal identification number, time-of-day of transaction, allowable merchant, allowable quantity, allowable number of purchases within a prescribed period of time and the like.

The credit card processor 30 accumulates and analyzes the loyalty rewards network data according to collection parameters stored on a loyalty reward network database, and may be one or more computers or servers to store the program products and databases thereon as is known by those of skill in the art. The collection parameters are rules-based, table-driven and configurable in real-time. The credit card processor 30 enables a plurality of member customers to accumulate loyalty rewards and use them at the member customer's discretion, so long as within the collection parameters. The loyalty reward can, for example, correspond with purchasing behavior and reward the member customer for purchasing products. The credit card processor 30 accumulates the loyalty reward network data in a loyalty rewards network database portion of loyalty rewards data storage 32 stored in a memory 34. The memory 34 is accessible as a component portion of the credit card processor 30, or it may also take the form of a digital data storage device or media otherwise accessible to the credit card processor 30. The memory 34 also includes or has access to a digital data storage area or device 36 containing customer card account data for a financial institution or organization offering regular credit card services.

Figure 2:
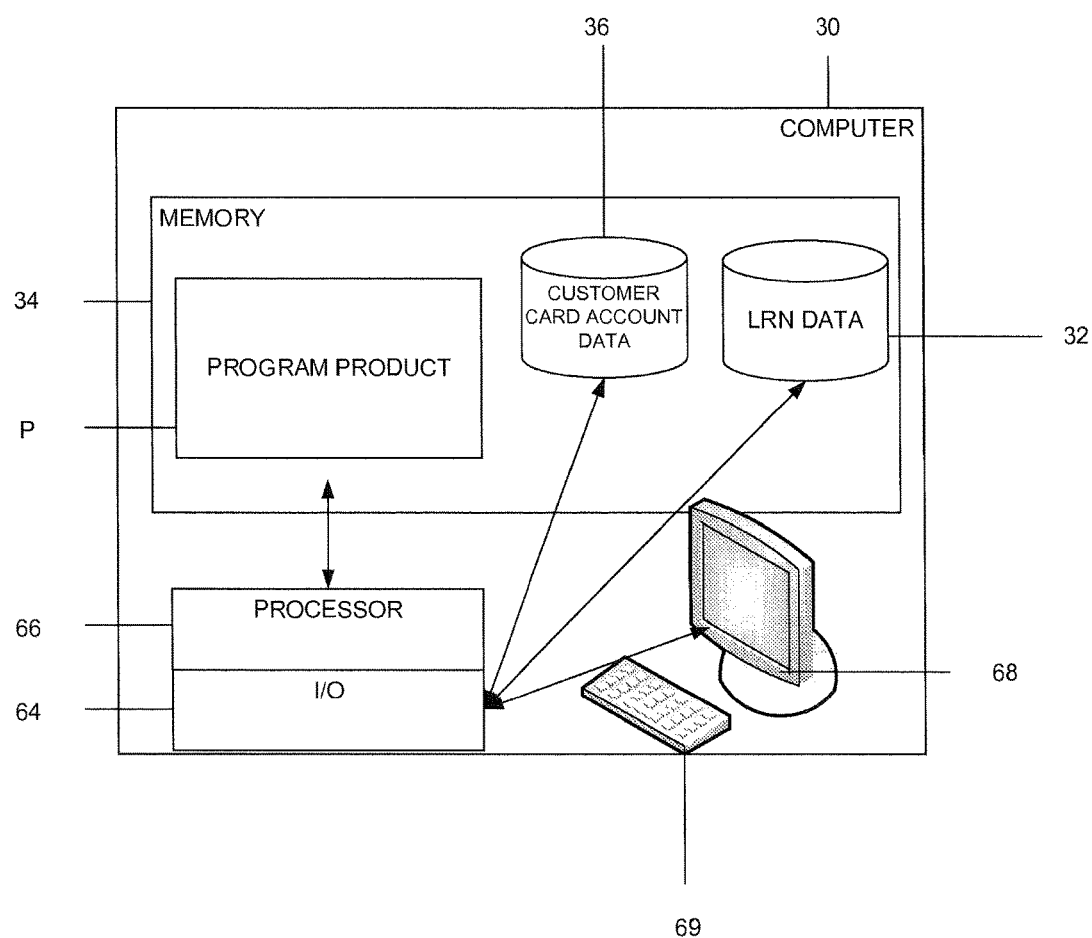
FIG. 2 is a schematic diagram of a computer system for managing and controlling a loyalty rewards network according to embodiments of the present invention.

As further shown in FIG. 2, the credit card processor 30 can include memory 34 storing the royalty reward data 32, customer card account data 36, and computer program product P, an input/output ("I/O") interface 64 for transferring information or data, as well as commands to the computer 30, a processor 66 from directing data to and from the memory, a computer terminal 68 for displaying data to a user. The I/O interface 64 also receives data and information furnished the computer 30 from other authorized sources over the electronic communications network 28. The I/O interface 64 can be any I/O interfaces including, but not limited to, a network card/controller connected by a PCI bus to the motherboard, or hardware built into the motherboard of the computer 30. As can be seen, the I/O interface 64 is connected to the processor 66.

The processor 66 is the "brains" of the credit card processor computer 30, and as such executes program product and work in conjunction with the I/O interface 64 to direct data to memory 34 and to send data from memory 34 to the communications medium 28. Processor 28 can be any commercially available processor, or plurality of processors, adapted for use for the computer 30, e.g., Intel® Xeon® multicore processors, Intel® micro-architecture Nehalem, AMD Opteron™ multicore processors, etc. As one skilled in the art will appreciate, processor 28 may also include components that allow the to be connected to a display 68 and keyboard [not shown] that would allow a user to directly access loyalty rewards network data stored in memory 34.

Memory 34 stores the program product of the instant invention, customer account database 36, and loyalty rewards network database 32. It should be understood that various types of computer readable media are available and adapted for use as memory 34 to store the computer program product P and the forms of loyalty reward data 32 and customer card account data 36 according to the present invention. Such forms of computer readable media include but are not limited to tangible storage media, such as nonvolatile, hard-coded type media such as read only memories (ROMs), CD-ROMs, and DVD-ROMs, or erasable, electrically programmable read only memories (EE-PROMs), recordable type media such as floppy disks, hard disk drives, CD-R/RWs, DVD-RAMs, DVD-R/RWs, DVD+R/RWs, flash drives, memory sticks, and other newer types of memories; as well as transmission type media such as digital and analog communication links. The data stored in such media may also include loyalty rewards network data and criteria, and operating instructions for management and control of the loyalty rewards network, as well as instructions related to operation of the computer system 30 and performance of the method steps described above. It should also be understood that such media can be at other locations instead of or in addition to the locations described above to store program products, e.g., including software, thereon.

Returning to FIG. 2, the loyalty rewards database 32 may be stored in, e.g., a database in memory 34, and can include, among other things, one or more of the following stored in, e.g., separate tables, columns or fields: (i) the loyalty reward network card number, (ii) the date and time of the transaction; (iii) the merchant category code ("MCC"), which is similar to a standard industrial classification ("SIC") code; (iv) the merchant's name; (v) terminal identification number upon which the loyalty reward network transaction occurred; and (vi) the dollar value of the customer's purchase. It should be understood that other additional types of data may also be required to be collected, if desired. The loyalty rewards network data 32 may also include machine-readable data concerning loyalty rewards criteria, rules and conditions, as well as collection parameters. The collection parameters are rules-based, table-driven and preferably configurable in real-time. The rules, conditions, and criteria establish availability, amount, and terms for obtaining loyalty rewards or use of such rewards and are chosen by the network provider or service of the loyalty rewards network.

A user may access the loyalty rewards network database 32 via, e.g., a web-based system interacting with the credit card processor computer I/O device 34, processor 66, and program product P. In such a configuration, loyalty reward network participants including, participating merchants, card distribution partners, loyalty rewards network sponsors, and participating customers, would be able to see, among other things, the number of loyalty reward network purchases that have been transmitted and processed, and loyalty rewards that have been requested and fulfilled.

Returning to FIG. 2, the customer card account database 36 stores customer account data and may have separate tables, columns or fields that are used to link the customer to the data in the loyalty rewards network database 32, provide enrollment data for the loyalty rewards network, or otherwise associate an existing credit card customer with the loyalty rewards network. As such, the loyalty rewards network permits customers who are interested in participation in the loyalty rewards network to join using, e.g., existing credit card data. Customer card account database 36 can therefore include, e.g., data such as a customer name, customer social security number, customer address, customer demographic information, customer payment history, amount owed on account, etc.

Figure 3:
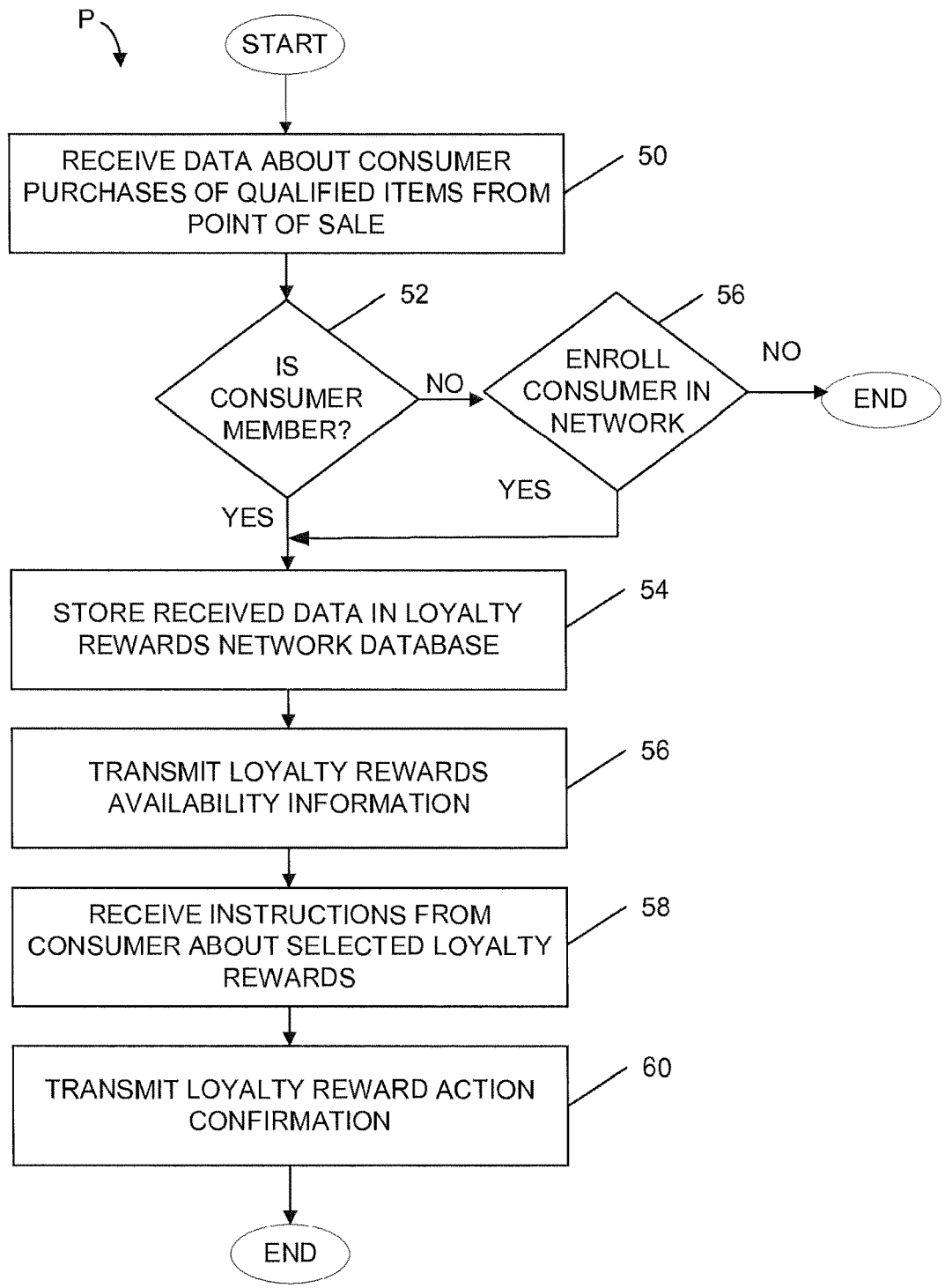
FIG. 3 is a schematic diagram of a computer-implemented method performed in a computer according to embodiments of the present invention.

Referring now to FIG. 3, a computer-implemented method according to program product P of an embodiment of the invention is set forth. As will be set forth, in the process P, a computer implemented method or process can cause the credit card processor computer 30 to manage the loyalty rewards network and provide customer loyalty rewards based on purchases by the customer. The amount and type of rewards are based on collection parameters stored in the memory 32, e.g., the loyalty rewards database 32, accessible to the computer 30. Embodiments of the present invention can include, as indicated at step 50 of FIG. 3, receiving data at the computer 30 from a POS about purchases of the customer entitling the customer to obtain loyalty rewards.

The computer-implemented method then determines at step 52 if the customer is one of the plurality of member customers enrolled in the loyalty reward network based on the contents stored in the loyalty reward network database 32 and the received loyalty reward data. If the customer is not a member customer, the computer 30 at step 56 customer inquires through the communications media 28 of the customer's interest in joining the loyalty rewards network. If the customer indicates interest in the loyalty reward network, enrollment occurs in the manner previously described above, and processing continues. If no interest is manifested, processing according to the present invention terminates.

The program product P, during step 54, stores the received loyalty rewards network customer data in the loyalty rewards network database 32, and determines the availability loyalty rewards action according to the stored loyalty rewards collection parameters and the accumulated loyalty rewards network data for the member customer. The computer 30 transmits via the communication media 28 the determined available loyalty rewards action to the member customer at step 56. The member customer then selects on or more loyalty reward actions and sends the selection to the computer via the communication medium 28 at step 58. During step 60, the computer implements the one or more selected loyalty reward action and sends a loyalty reward action confirmation over the communications media 28 from the computer 30 to the member customer. For example, if the computer determines based on the collection parameters and other data stored in the loyalty reward network database 32 that a $10 gift card is an available loyalty reward action, such information is transmitted to the member customer. If the member customer, in this example, selects the $10 gift card, the computer implements this action and transmits a loyalty reward action confirmation to the member customer. In the alternative, if the member customer does not select one or more available loyalty reward actions, then the computer will store the loyalty rewards for later use at the member customer's discretion.

Figure 4:
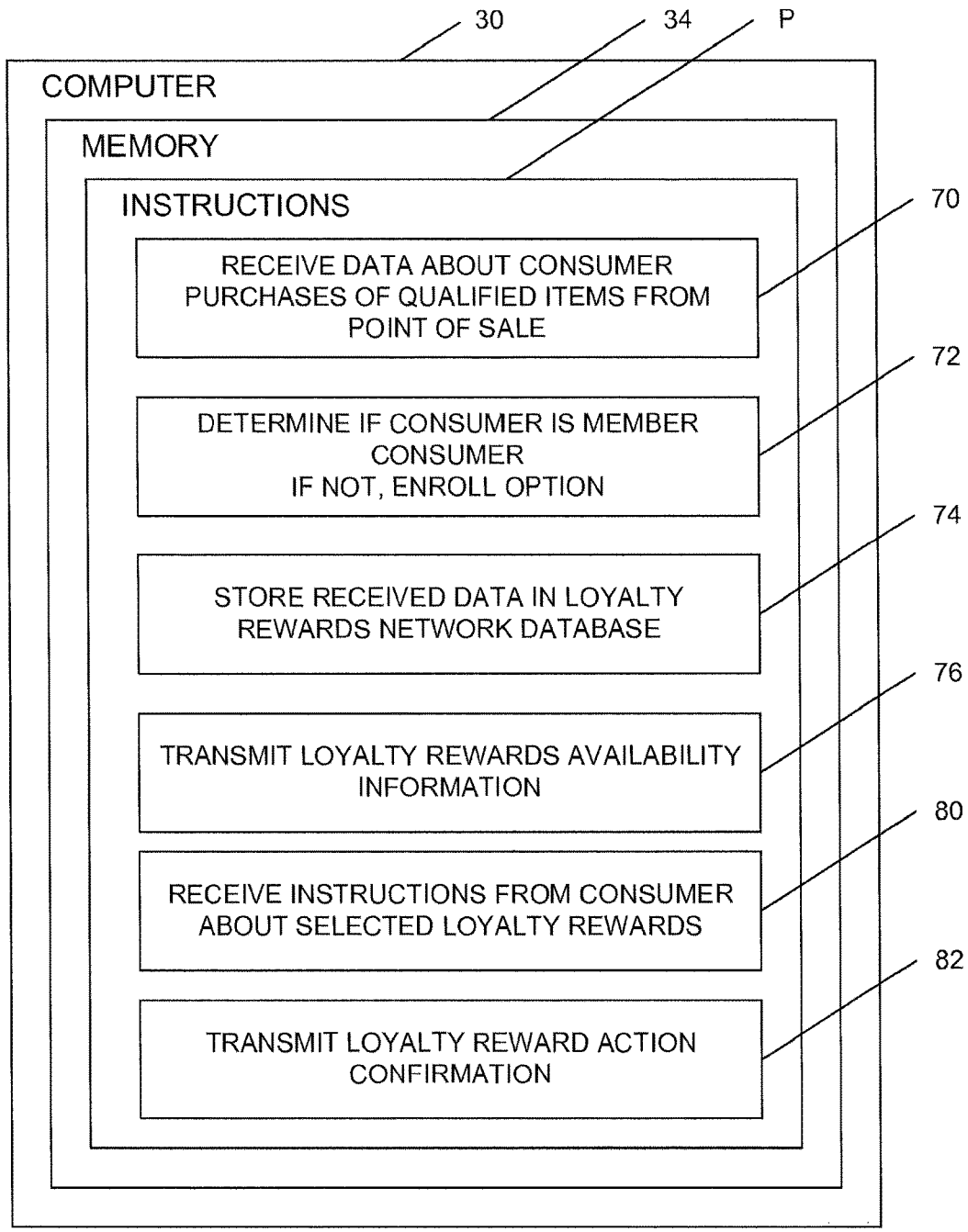
FIG. 4 is a schematic diagram of a computer program product stored in a computer readable medium for managing and controlling a loyalty rewards network according to embodiments of the invention.

The computer program product P, as illustrated in FIG. 4, is operable on the computer 30, stored on a tangible computer memory media 34, and operable by the processor 66 on the computer 30. The computer program product P comprises a set of instructions 70 that, when executed by the processor 66, cause the computer 30 to perform various operations. For example, the operations may include receiving data from a point of sale about purchases of a customer entitling the customer to obtain loyalty rewards (step 70). The computer program product P further includes operations to determine or confirm from the received data that the customer is one of the plurality of member customers enrolled in the loyalty reward network (step 72).

The computer program product P can further include, for example, operations for inquiring about the customer's interest in joining the loyalty rewards network in the event that the customer making purchases is not already a member (step 72). If the customer indicates membership or participation interest, enrollment is made available by the computer. If no interest is manifested, the computer program product according to the present invention terminates. Enrollment may occur before or at the time of making a purchase from a participating merchant. For example, a customer not yet a member of the loyalty rewards network, but having a customer card account with a participating merchant institution or entity participating in the loyalty rewards network, may indicate such an interest. The customer can be identified for subsequent loyalty rewards participation from data indicated by the contents of a customer card account database 36, which is the conventional credit card database with the participating merchant or organization offering the credit card processor 30, e.g., includes data such as a customer name, customer social security number, customer address, customer demographic information, customer payment history, amount owed on account, etc.

For example, when such an existing credit card customer indicates an interest in the loyalty rewards network, loyalty reward information beyond that already stored in the customer account database is then requested and electronically gathered and sent from the merchant to the credit card processor 30 for storage in either the customer account database 36, e.g., to link the customer account database to the loyalty rewards database 32, or the loyalty rewards network database 32, e.g., to include purchase data, rewards points and other criteria identified above. Appropriate processing to authorize the interested customer as a new member may also occur. Once authorized, the new member to the loyalty rewards network is furnished a unique loyalty rewards card number and a loyalty rewards card that may at first be a temporary one, and followed later by a permanent one for continuing use and participation in the loyalty rewards program. The computer program product P also includes, for example, storing and analyzing the received customer data in the loyalty rewards network database 32 (step 74) commensurate with the steps noted above.

After the issuance of the loyalty reward card, the customer may also register their, interest in receiving rewards. This may be accomplished for example, by electronic message transmission, a web-interface, an interactive voice response unit or a cell phone text message, or short message service (SMS) message, with registration data to be stored in either the customer card account database 36, loyalty rewards database 32, or a combination thereof. The loyalty reward network may or may not send back an acknowledgement of registration to the member customer at the time of joining the network. In any event, a loyalty reward network card and card number are both delivered in an appropriate and customary time manner to the customer for continuing use. As such, loyalty reward card delivery can either be electronic, e.g., via e-mail, or through actual delivery of a standard thirty-mil plastic card with a magnetic stripe that functions on a traditional financial services network, e.g., MasterCard®, Visa®, Discover®, or American Express®.

Uniqueness of card numbers is preserved by generating all numbers through check-sum-digit algorithms based on DES-3 standards. The Bank Identification Number ("BIN) that the physical or virtual loyalty cards function is configured such that when loyalty reward network transactions are transmitted, they are not reported or recorded as financial transactions. Accordingly, the loyalty reward data does not cause financial settlement to occurs. Financial settlement, however, can occur if the method of payment is a credit card transaction, or other type of transaction, that is transmitted over the existing financial services electronic payment network for authorization.

The computer program product P further can include operations for determining the available loyalty reward action for the member customer and sending the member customer one or more available loyalty reward actions (step 76). Upon of the accumulation of sufficient loyalty rewards stored in the loyalty reward network database 32 for a member customer pursuant to collection parameters, the credit card processor 30 offers the member customer the available loyalty rewards to use customer at the customer's discretion. Use of the loyalty rewards may or may not be restricted to use at participating loyalty reward network merchants. For example, upon spending $200 in the loyalty reward network, the customer may earn a specified amount such as $10, which represents a trigger point for offering the customer a financial network branded gift card from a participating merchant in that amount. It should be understood that the loyalty rewards according to the present invention may take other forms than gift cards. For example, the loyalty reward may take the form of payment to some other entity. Other entities to which payments may be made include, for example, (i) the loyalty reward network itself indicated at N as managed by credit card processor 30; (ii) one or more of the participating merchants; (iii) a loyalty reward network sponsors 38, who may or may not have their particular brand displayed on the loyalty reward network card; and (iv) a loyalty reward network card distribution Partners as indicated at 40, e.g., merchants and other customers. The operations can further include receiving instructions from the customer one or more selected loyalty rewards (step 80). In such a process, the computer then implements the one or more selected loyalty reward action and sends the member customer a confirmation loyalty reward action (step 82).

The present invention also permits partial authorization of loyalty rewards in appropriate circumstances. In a situation where a partial authorization of a customer request for a loyalty reward is permissible, an authorization request from the customer originates in the merchant or POS terminal 24. The authorization request sent includes in the message a coded indicator or flag indicating that the terminal is capable of a partial authorization response. When the credit card processor 30 receives the message with the partial authorization flag, if the entire amount cannot be authorized, the credit card processor 30 can send back a conditional authorization message indicating that even though the original amount cannot be authorized, a lesser amount can be authorized.

For example, if the authorization request is for $20, but the loyalty reward balance is only $10, rather then sending back a decline, the conditional authorization response is granted for the amount of $10. In the loyalty reward network scenario, the authorization request will be for the full amount of the purchase and the conditional authorization amount will be $0. Use of the partial authorization message in this manner according to the present invention thus allows the Loyalty Reward Network to communicate back to the merchant and to the Loyalty Reward Network cardholder that the Loyalty Reward Network Data has, in fact, been captured.

In some embodiments, the credit card processor 30 after analyzing and accumulating the loyalty reward network data, can, for example, transmit notice of receipt to the customer. Transmissions to the customer may occur in a number of ways including, but not limited to, by short message service (SMS), email, receipt of a traditional response code that may be configured in such a way as to communicate additional order-specific data back to the customer, or through the unique use of a network partial authorization message.

Embodiments of the invention can also include making at least some of the stored loyalty rewards data available to a loyalty rewards network sponsor 38, a loyalty rewards network card distribution partner 40, a participating merchant, and a member customer through one or more communication networks not associated with the financial services electronic payment network. Operations can include, for example, compiling loyalty rewards network data, real-time, for transmission to one or more loyalty rewards network sponsor 38, a loyalty rewards network card distribution partner 40, and a participating merchant. Beneficially, subscribing entities could access near real-time purchasing behavior, irrespective of the method of payment or type of goods or services provided. Such data across multiple merchants can be invaluable to marketers, especially for marketers interested in the demographics that are not typically participants in credit card programs. customer Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

This application is a continuation of and claims priority to the benefit of U.S. patent application Ser. No. 12/892,847, filed Sep. 28, 2010, titled "Computer-Implemented Methods, Computer Program Products, and Systems for Management and Control of a Loyalty Rewards Network" which claims priority and is related to U.S. Provisional Patent Application No. 61/246,391, filed Sep. 28, 2009 titled "Computerized Management and Control of Customer Loyalty Rewards Network, Associated Systems and Computer program Products" and U.S. Utility application No. 12/626,349, filed Nov. 25, 2009 titled "Machine, Methods, And Program Product For Electronic Inventory Tracking", each of which are incorporated herein by reference in their entirety.

The invention claimed is:

1. A computer adapted to facilitate management of loyalty rewards to be used with a plurality of merchants irrespective of forms of payment used by a consumer to define a loyalty rewards management computer, the computer comprising:
  one or more databases comprising a plurality of reward parameters, and a plurality of loyalty rewards look tables that correlate a plurality of loyalty reward unique identifiers with a plurality of loyalty reward accounts, each of the plurality of loyalty rewards unique identifiers comprising one of a plurality of bank issuing number (BIN) issued by a financial institution and associated with one of the plurality of loyalty rewards accounts, the BIN of the loyalty rewards unique identifiers being compatible with an existing electronic financial payment network adapted to identify a plurality of issuer of the plurality of BIN, the existing electronic financial payment network further being adapted to set transaction rules to settle funds between parties of transactions;
  one or more processors configured to process electronic loyalty reward network data received from a plurality of merchants;
  non-transitory memory encoded with one or more computer programs operable by the one or more processors so that during operations thereof, the one or more processors operate to perform the following steps:
  determining a receipt of one or more first transaction messages comprising a respective one or more of the plurality of loyalty rewards unique identifiers stored on a loyalty rewards card, the one or more first transaction messages being sent through the existing electronic financial payment network from a respective one or more of a plurality of merchant acquirer computers responsive to one or more of the plurality of loyalty reward accounts interfacing with a point of sale terminal associated with the one of the plurality of merchants, wherein the one or more first transaction messages are not reported or recorded as a financial transaction, wherein each of the one or more the first transaction messages further comprises a transaction date, a transaction time, a merchant category code, a merchant acquirer identification, and a terminal identification number;
  determining availability of one or more loyalty rewards actions according to reward parameters stored in the one or more databases;
  communicating the one or more loyalty rewards actions to the one or more of the plurality of merchant acquirer computer via the existing electronic financial payment network, each of the one or more loyalty reward actions being available responsive to a tender of sufficient payment for one or more goods or services from the one of the plurality of merchant;
  receiving a selection of one of the one or more loyalty rewards actions from the consumer, the one or more loyalty rewards actions comprising issuing a gift card;
  sending a loyalty reward action confirmation to the consumer;
  implementing the one or more loyalty rewards actions responsive to receiving one or more second transaction messages sent via the existing electronic financial payment network from the one or more of the plurality of merchant acquirer computers, the one or more second transaction messages indicating the tender of sufficient payment for the goods or services, wherein the one or more loyalty rewards actions are implemented irrespective of a form of payment, wherein the forms of payment comprises a credit card, a debit card, cash, and a check; and
  aggregating data from a plurality of the one or more second transaction messages received from the plurality of merchants independent of the forms of payment to thereby enable a creation of targeted marketing data,
  wherein the one or more second transaction messages further comprise data that indicates one or more of the following data items: merchant category code, merchant identification number, standard industrial classification, terminal identification number, date purchased, time-of-day purchased, dollar value of purchase, and name of consumer.

2. A loyalty rewards management computer as defined in claim 1, wherein the existing financial services electronic payment network is one of the following: MasterCard®, Visa®, American Express®, and Discover® networks.

3. A loyalty rewards management computer as defined in claim 1, wherein the computer is associated with the financial institution; and wherein the one or more computer programs further operates to perform the step of: issuing the plurality of BIN.

4. A loyalty rewards management computer as defined in claim 1, wherein the one or more second transaction messages indicate the tender of sufficient payment for goods using a credit card account issued by a different financial institution that the financial institution that issued the plurality of BIN of the plurality of loyalty rewards unique identifiers.

5. Non-transitory memory encoded with one or more computer programs operable by a computer adapted to facilitate management of loyalty rewards to be used with a plurality of merchants irrespective of forms of payment used by a consumer to define a loyalty rewards management computer, the one or more computer programs comprising instructions that when executed by the loyalty rewards management computer, the loyalty rewards management computer operates to perform the following steps:
  determining a receipt of one or more first transaction messages comprising a respective one or more of a plurality of loyalty rewards unique identifiers stored on a loyalty rewards card, the one or more first transaction messages being sent through an existing electronic financial payment network from a respective one or more of a plurality of merchant acquirer computers responsive to one or more of a plurality of loyalty reward accounts interfacing with a point of sale terminal associated with the one of a plurality of merchants, the plurality of loyalty rewards unique identifiers comprising one of a plurality of bank issuing number (BIN) issued by a financial institution and associated with one of the plurality of loyalty rewards accounts, wherein the one or more first transaction messages are not reported or recorded as a financial transaction, wherein each of the one or more the first transaction messages further comprises a transaction date, a transaction time, a merchant category code, a merchant acquirer identification, and a terminal identification number;

determining availability of one or more loyalty rewards actions according to reward parameters;

communicating the one or more loyalty rewards actions to the one or more of the plurality of merchant acquirer computer via the existing electronic financial payment network, each of the one or more loyalty reward actions being available responsive to a tender of sufficient payment for one or more goods or services from the one of the plurality of merchant;

receiving a selection of one of the one or more loyalty rewards actions from the consumer, the one or more loyalty rewards actions comprising issuing a gift card;

sending a loyalty reward action confirmation to the consumer;

implementing the one or more loyalty rewards actions responsive to receiving one or more second transaction messages sent via the existing electronic financial payment network from the one or more of the plurality of merchant acquirer computers, the one or more second transaction messages indicating the tender of sufficient payment for the goods or services, wherein the one or more loyalty rewards actions are implemented irrespective of the forms of payment, wherein the forms of payment comprises a credit card, a debit card, cash, and a check; and aggregating data from a plurality of the one or more second transaction messages received from the plurality of merchants independent of the forms of payment to thereby enable a creation of targeted marketing data, wherein the one or more second transaction messages further comprise data that indicates one or more of the following data items: merchant category code, merchant identification number, standard industrial classification, terminal identification number, date purchased, time-of-day purchased, dollar value of purchase, and name of consumer.

6. Non-transitory memory as defined in claim 5, wherein the one or more second transaction messages indicate the tender of sufficient payment for goods using a credit card account issued by a different financial institution than the financial institution that issued the plurality of BIN of the plurality of loyalty rewards unique identifiers.

7. Non-transitory memory as defined in claim 5, wherein the loyalty rewards management computer is associated with the financial institution; and wherein the one or more computer programs further operates to perform the step of: issuing the plurality of BIN.

8. A computer-implemented method to facilitate management of loyalty rewards to be used with a plurality of merchants irrespective of forms of payment used by a consumer, the method comprising:

determining, by a computer adapted to facilitate management of loyalty rewards to define loyalty rewards management computer, a receipt of one or more first transaction messages comprising a respective one or more of a plurality of loyalty rewards unique identifiers stored on a loyalty rewards card, the one or more first transaction messages being sent through an existing electronic financial payment network from a respective one or more of a plurality of merchant acquirer computers responsive to one or more of a plurality of loyalty reward accounts interfacing with a point of sale terminal associated with the one of a plurality of merchants, the plurality of loyalty rewards unique identifiers comprising one of a plurality of bank issuing number (BIN) issued by a financial institution and associated with one of the plurality of loyalty rewards accounts, wherein the one or more first transaction messages are not reported or recorded as a financial transaction, wherein each of the one or more the first transaction messages further comprises a transaction date, a transaction time, a merchant category code, a merchant acquirer identification, and a terminal identification number;

determining, by the loyalty rewards management computer, availability of one or more loyalty rewards actions according to reward parameters;

communicating, by the loyalty rewards management computer, the one or more loyalty rewards actions to the one or more of the plurality of merchant acquirer computer via the existing electronic financial payment network, each of the one or more loyalty reward actions being available responsive to a tender of sufficient payment for one or more goods or services from the one of the plurality of merchant;

receiving a selection of one of the one or more loyalty rewards actions from the consumer, the one or more loyalty rewards actions comprising issuing a gift card;

sending a loyalty reward action confirmation to the consumer;

implementing the one or more loyalty rewards actions responsive to receiving one or more second transaction messages sent via the existing electronic financial payment network from the one or more of the plurality of merchant acquirer computers, the one or more second transaction messages indicating the tender of sufficient payment for the goods or services, wherein the one or more loyalty rewards actions are implemented irrespective of the forms of payment, wherein the forms of payment comprises a credit card, a debit card, cash, or a check; and aggregating data from a plurality of the one or more second transaction messages received from the plurality of merchants independent of the forms of payment to thereby enable a creation of targeted marketing data, wherein the one or more second transaction messages further comprise data that indicates one or more of the following data items: merchant category code, merchant identification number, standard industrial classification, terminal identification number, date purchased, time-of-day purchased, dollar value of purchase, and name of consumer.

9. A computer-implemented method as defined in claim 8, wherein the one or more second transaction messages indicate the tender of sufficient payment for goods using a credit card account issued by a different financial institution than the financial institution that issued the plurality of BIN of the plurality of loyalty rewards unique identifiers.

10. A computer-implemented method as defined in claim 8, the method further comprising: issuing, by the loyalty rewards management computer, the plurality of BIN; and wherein the loyalty rewards management computer is associated with the financial institution.

11. A computer-implemented method as defined in claim 8, wherein the existing financial services electronic payment network is one of the following: MasterCard®, Visa®, American Express®, and Discover® networks.

* * * * *